Figure 1:
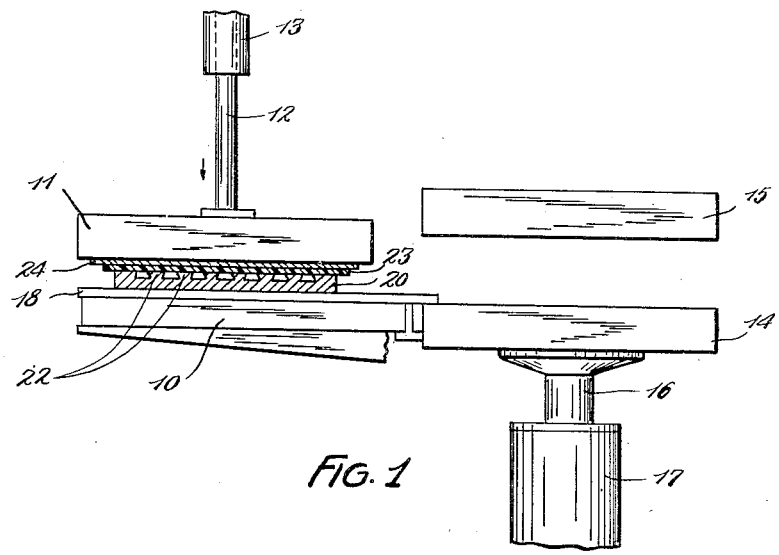

Jan. 2, 1951  H. G. SCHWARZ ET AL  2,536,316

METHOD OF MAKING ELECTROTYPE MOLDS

Filed May 3, 1949

INVENTORS
HOWARD G. SCHWARZ
BY EDWARD F. BURES
Hudson, Boughton,
Williams, David & Hoffmann.
ATTORNEYS Patented Jan. 2, 1951

2,536,316

UNITED STATES PATENT OFFICE 2,536,316

METHOD OF MAKING ELECTROTYPE MOLDS

Howard G. Schwarz, Newbury, and Edward F. Bures, Cleveland, Ohio, assignors to The Art Electrotype Company, Cleveland, Ohio, a corporation of Ohio Application May 3, 1949, Serial No. 91,124

6 Claims. (Cl. 18—56)

This invention relates to improvements in method of making electrotype molds or matrices.

It is now conventional practice in modern electrotype shops to mold matrices from thermoplastic material. A highly successful material for the purpose is vinyl acetate-vinyl chloride copolymer which may be used in sheets that are quite thin. This material softens upon the application of heat at temperatures in the neighborhood of 220° to 230° F. When cooled it hardens and maintains its new contours and dimensions which are exact reproductions of the type form or molding pattern. In order to employ a thin sheet of vinyl plastic and cause it to be deformed to the contours of the molding pattern it is necessary to superpose upon it a relatively thick blanket of compressible, and preferably resilient, material which yields to accommodate the different degrees of deformation in the vinyl sheet.

Some difficulty has been encountered in stripping a mold of this character from the molding pattern, whether type form or otherwise, but especially in the case of photoengravings, such as zinc or copper etchings which in some cases are undercut and hence tend to lock themselves to the mold. In accordance with the present invention a thin sheet of a tough pliable plastic material which is heat resistant, and therefore not affected by the heat which softens the vinyl plastic sheet, is placed over the latter between it and the rubber blanket. This tough pliable plastic sheet is not readily compressible, like the rubber blanket, but stretches and bends to impart contours to the rear side of the vinyl sheet which somewhat resemble but are much less sharp than the contours on the forward side of that sheet resulting from its contact with the molding pattern. Apparently this heat resistant plastic lessens to some extent the pressure exerted upon that part of the vinyl sheet which is depressed into the cavities of the molding pattern below the top surface thereof. Assuming that our theory is correct, it consequently prevents the vinyl plastic from being forced into the undercut portions of the molding pattern. In any event the use of this tough plastic heat resistant material on the rear side of the vinyl sheet overcomes the difficulty previously encountered of separating the mold from the molding pattern, be it a type form or an etching.

An object of the invention therefore is the provision of a method of making matrices or molds for electrotype production from thin sheets of thermoplastic material, which shall reduce or eliminate difficulty in stripping the mold from the molding pattern.

Other objects and features of novelty will appear as we proceed with the description of that embodiment of the invention which, for the purposes of the present application, we have illustrated in the accompanying drawing, in which Fig. 1 is a diagrammatic elevational view of apparatus which may be employed in carrying out the invention, illustrating the step of heating the sheet of thin thermoplastic material.

Figure 2:
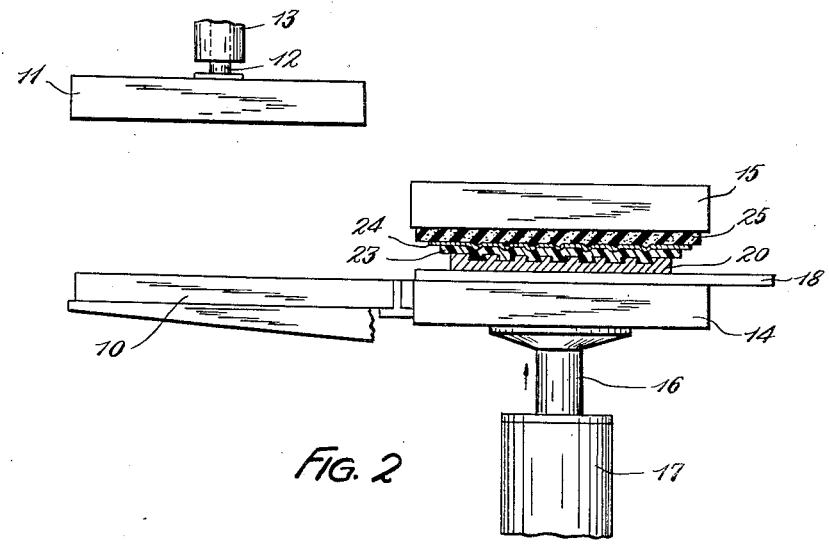
Figure 3:
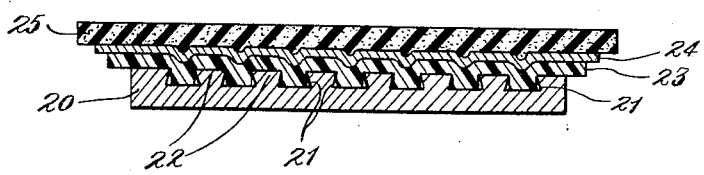

Fig. 2 is a similar view illustrating the step of exerting pressure to effect the molding of the thermoplastic sheet against the molding pattern, and Fig. 3 is a greatly enlarged cross-sectional view of a metallic undercut photoengraving or molding pattern with a thermoplastic sheet of material compressed against its flush surface and into its depressions, a sheet of heat resistant, tough, pliable plastic in contact with its surface remote from the molding pattern and above that a relatively thick compressible blanket, all in the positions assumed during the molding operation.

Referring to the drawing, 10 represents an extension table of a molding press commonly used in establishments in which electrotypes are made. Disposed above the table 10 there is a hot plate 11 which is carried at the lower end of a plunger 12 that may be moved up and down hydraulically or pneumatically in a cylinder 13. Flush with table 10 is the platen 14 of the press, which is movable toward or away from the upper platen 15 by a plunger 16 working in a power cylinder 17 capable of exerting controlled pressure of the desired amount.

With the hot plate 11 raised as in Fig. 2, a flat steel plate 18 may be placed on table 10 as a base for the assemblage of the parts which enter into the forming of a mold. The difficulty of stripping a mold from a molding pattern is greatest in the case of an etching, and for the purposes of the present disclosure we have shown an etching 20 in a diagrammatic way, that is with an etched portion greatly exaggerated in size. These etched cavities are illustrated as having walls 21 which are undercut with respect to the flush surfaces 22 which would constitute the printing surfaces if the etching were used directly as a printing form. While we have referred to the illustrated element 20 as an etching, it is to be understood that the term molding pattern as herein employed is intended to refer to a type form, an etching or any printing element other than a planographic element.

We prefer to preheat the molding pattern 20 to a temperature of approximately 180° F. The plate 18 is then placed on the table 10 and the molding pattern laid upon it. Over the molding pattern there is placed a sheet 23 of thin thermoplastic material, preferably vinyl acetate-vinyl chloride co-polymer. On top of that we place a thin sheet of tough pliable heat resistant plastic 24. The hot plate 11 is then lowered until it rests upon the heat resistant sheet 24 making sufficiently good contact to conduct heat from the hot plate to the thermoplastic sheet 23. The parts remain in this condition until the temperature of the thermoplastic sheet reaches 200° to 230° F., which softens the thermoplastic sufficiently for the molding operation. The top element 25 is a relatively thick blanket of compressible, relatively resilient, rubber-like material. It may consist largely of synthetic rubber. This element 25, after being warmed separately on a warm-up table is placed above the heat resistant sheet 24.

Except for the introduction of the tough, pliable heat resistant plastic sheet 24 the above procedure is well-known in the art, and is described in Kreber et al. Patent 2,400,513. The properties which the sheet 24 should possess include the quality of being unaffected by heat up to 230° F., in other words a quality the reverse of the plasticity of the vinyl sheet 23 when heated. It should be pliable, that is bendable and stretchable, to some extent in order to transmit pressures exerted by the press through the blanket 25 tending to force the thermoplastic material into the depressions and crevices of the printing pattern. It should be tough and capable of being used over and over. It should be free from grain and it should not adhere or stick to other materials.

The material which we prefer for this purpose, and which possesses all of the desirable characteristics above enumerated, it a polytetrafluoroethylene polymer in thin sheets.

When the thermoplastic sheet 23 has reached the molding temperature the hot plate 11 is raised and the plate 18 with a molding pattern and sheets 23, 24 and 25, is pushed onto platen 14 of the press. Platen 14 is then raised and pressure is exerted for the molding operation. The pressure which we employ is much lower than that conventionally used in the prior art. We have found that a pressure of from 60 to 80 lbs. per square inch is generally sufficient, in contrast to a pressure of several hundred pounds per square inch as advocated in the aforesaid Kreber et al. patent, and high pressures commonly used in molding matrices from thermoplastic material. The higher range of pressures is not required in our method because of the freedom from grain in the heat resistant sheet 24. Grain in the blanket 25 as previously used is transmitted to the mold surfaces of the matrix unless the pressure exerted is high enough to eliminate grain. Our heat resistant plastic, being grainless, does not transmit the grain of the blanket even under the low pressures above mentioned.

As indicated in Fig. 3 the thermoplastic material of sheet 23 under the action of the press conforms accurately to the working surfaces of the molding pattern, but it does not contact so closely the lower portions of the undercut walls 21. We are unable to state definitely why this is the fact, but we do know that it results from the use of the tough, pliable, heat resistant plastic, and we assume that it is because of the relatively light pressures which may be employed without transmitting grain, as above explained.

The pressure exerted by the press is maintained for the length of time necessary to cool the thermoplastic sheet 23, which thereby is hardened and becomes a mold. When the platen 14 of the press is lowered the blanket 25 and the sheet 24 are lifted off readily. The mold may then be stripped from the molding pattern quite easily and without distortion or damage to itself or the pattern. Furthermore the same advantage is experienced after the electrotype shell is formed upon the mold and the two must be separated. This may be done without distorting the electrotype shell, which saves work in conditioning the latter, and at the same time the mold remains undamaged and may be used to produce duplicate electrotypes.

We have found also that the method yields excellent molds where the molding pattern consists partially of half tone illustrations mounted on wood blocks and partially of type all locked together. In such cases there may be a material variation in height between the type and the half tone plate or within the half tone plate itself. Previously it has been necessary in order to produce a good mold to spot the backs of the blocks with make ready in order to bring all surfaces to a uniform height. That procedure is not necessary when our method is employed except in cases where the blocks are exceptionally low.

The heat resistant plastic sheet, especially that which we have stated above is preferred, may be used repeatedly until it wears out. The vinyl plastic material may be used a number of times, and its life is increased materially when employed in our method in connection with the heat resistant plastic and reduced molding pressure. It then has less tendency to warp and when reconditioned by heating it may be smoothed out more effectively than when the prior art method is employed.

Having thus described our invention, we claim:

1. The method of making an electrotype mold which comprises disposing the face of a molding pattern in contact with a thin moldable sheet of dense thermoplastic material, applying to the back of said moldable sheet a thin sheet of tough, grain free, pliable plastic resistant to heat at least as high as 230° F., applying heat of the order of 200° to 230° F. to render said moldable sheet soft and moldable, applying a thick, compressible, grain carrying blanket to the back of said heat resistant sheet, pressing the pattern, sheets and blanket firmly together, thereby deforming said moldable sheet to conform it closely to the surface contours of said molding pattern and roughly to the sub-surface contours thereof, and holding the said sheets, blanket and molding pattern under pressure until the said moldable sheet has cooled and set.

2. The method of making an electrotype mold which comprises disposing the face of a printing pattern in contact with a thin moldable sheet of dense thermoplastic material, applying a thin sheet of tough, grain free, heat resistant polytetrafluoroethylene polymer to the back of said moldable sheet, applying heat sufficient to render said moldable sheet soft and moldable, applying a thick, compressible, grain carrying blanket to the back of the second named sheet, pressing the pattern, sheets and blanket firmly together, thereby deforming said moldable sheet to conform it closely to the surface contours of said molding pattern and roughly to the sub-surface contours thereof, and holding the said sheets, blanket and molding pattern under pressure until the said moldable sheet has cooled and set.

3. The method of making an electrotype mold as defined in claim 2, characterized in that the pressure exerted during the molding operation is from 60 to 80 lbs. per square inch.

4. The method of making an electrotype mold as defined in claim 2, wherein the pressure exerted during the molding operation is of the order of 60 lbs. per square inch.

5. The method of making an electrotype mold from a molding pattern having undercut contours, which comprises disposing the face of the molding pattern in contact with a thin moldable sheet of a vinyl acetate-vinyl chloride co-polymer, applying a thin sheet of tough, pliable, grain free, heat resistant plastic to the back of said moldable sheet, applying heat sufficient to render said moldable sheet soft and moldable, applying a thick, compressible, grain carrying blanket to the back of the second named sheet, and pressing the pattern, sheets and blanket together with a pressure of approximately 60 to 80 lbs. per square inch, thereby deforming said moldable sheet to conform it closely to the surface contours of said molding pattern while eliminating close conformity below the surface with the undercut contours of the pattern.

6. In the molding of molds for electrotypes from thin sheets of vinyl acetate-vinyl chloride co-polymer, the method which consists in heating said vinyl sheet to a molding temperature, making a sandwich of said vinyl sheet, a thin sheet of tough, grain free, heat resistant polytetrafluoroethylene polymer and a resilient thick, grain carrying blanket, placing said sandwich upon a molding pattern, blanket up, applying force of approximately 60 to 80 lbs. per square inch to compress said sandwich and maintaining said compressive force until said vinyl sheet cools, whereby the latter sheet forms a mold with depressed surfaces partaking closely of the contours of said molding pattern at the printing surface thereof and roughly of the contours below said printing surface.

HOWARD G. SCHWARZ.
EDWARD F. BURES.

REFERENCES CITED

The following references are of record in the file of this patent:

UNITED STATES PATENTS

| Number | Name | Date |
|---|---|---|
| 1,911,765 | Matthews et al. | May 30, 1933 |
| 2,278,291 | Swan | Mar. 31, 1942 |
| 2,400,518 | Kreber | May 21, 1946 |
| 2,463,370 | Flaster | Mar. 1, 1949 |
| 2,478,165 | Collins | Aug. 2, 1949 |